(12) United States Patent
Brown et al.

(10) Patent No.: US 11,686,392 B2
(45) Date of Patent: Jun. 27, 2023

(54) SCUPPER VALVE

(71) Applicant: Seaworthy Innovations, LLC, Westborough, MA (US)

(72) Inventors: Michael Patrick Brown, Westborough, MA (US); Tiffany Alongi, Westborough, MA (US); Gregory William Brown, Bellingham, MA (US)

(73) Assignee: Seaworthy Innovations, LLC, Westborough, MA (US)

( * ) Notice: Subject to any disclaimer, the term of this patent is extended or adjusted under 35 U.S.C. 154(b) by 0 days.

(21) Appl. No.: 17/588,528

(22) Filed: Jan. 31, 2022

(65) Prior Publication Data

US 2022/0316600 A1   Oct. 6, 2022

Related U.S. Application Data

(60) Provisional application No. 63/171,525, filed on Apr. 6, 2021.

(51) Int. Cl.
| | | |
|---|---|---|
| *F16K 1/20* | (2006.01) | |
| *F16K 27/02* | (2006.01) | |
| *B63B 13/00* | (2006.01) | |

(52) U.S. Cl.
CPC .......... *F16K 1/2064* (2013.01); *F16K 1/2071* (2013.01); *F16K 27/0227* (2013.01); *B63B 13/00* (2013.01)

(58) Field of Classification Search
CPC .. F16K 1/2064; F16K 1/2071; F16K 27/0227; F16K 15/03; F16K 15/031; B63B 13/02; B63B 13/00
See application file for complete search history.

(56) References Cited

U.S. PATENT DOCUMENTS

| | | | |
|---|---|---|---|
| 3,565,107 A | | 2/1971 | Bunch |
| 4,519,579 A | * | 5/1985 | Brestel .................... F16K 5/204 |
| | | | 251/177 |
| 5,385,108 A | | 1/1995 | Thompson |
| 2022/0065356 A1 | * | 3/2022 | Graichen .............. F16K 5/0257 |

FOREIGN PATENT DOCUMENTS

| | | | |
|---|---|---|---|
| CN | 107420559 A | * | 12/2017 |
| CN | 107795704 A | * | 3/2018 |

\* cited by examiner

*Primary Examiner* — Marina A Tietjen
(74) *Attorney, Agent, or Firm* — Sheehan Phinney Bass & Green PA

(57) ABSTRACT

A scupper valve includes a frame and a rigid flapper coupled to the frame. The rigid flapper is configured to swing relative to the rigid frame between an open and closed position. A flexible annular seal defines a centrally-disposed circular opening and a first annular projection that surrounds the centrally-disposed opening. The rigid flapper, in the closed position, contacts a distal edge of the first annular projection to create a circular line contact that restricts or prevents fluid flow through the centrally-disposed circular opening in the flexible annular seal. A rigid annular backplate is adjacent to and in direct physical contact with an annular surface of the flexible seal on a side of the flexible seal opposite the rigid flapper.

29 Claims, 12 Drawing Sheets

SCUPPER VALVE

CROSS-REFERENCE TO RELATED APPLICATION(S)

This application claims the benefit of priority to U.S. Provisional Patent Application No. 63/171,525, entitled SCUPPER FOR BOAT, which was filed on Apr. 6, 2021. The disclosure of the prior application is incorporated by reference herein in its entirety.

BACKGROUND

A scupper is an opening in the side walls of a vessel, for example, which allows water to drain overboard instead of pooling on a deck of the vessel. A scupper valve controls the fluid flow through the scupper. More specifically, a scupper on a boat may be fitted with a scupper valve that allows water to drain from inside the boat's hull through the scupper to outside the boat's hull while simultaneously restricting flow through the scupper in the opposite direction. Scuppers are essential to many boats as rainwater and water from waves must be removed effectively from the boat to prevent sinking.

SUMMARY OF THE INVENTION

In one aspect, a scupper valve includes a frame and a rigid flapper coupled to the frame. The rigid flapper is configured to swing relative to the rigid frame between an open and closed position. A flexible annular seal defines a centrally-disposed circular opening and a first annular projection that surrounds the centrally-disposed opening. The rigid flapper, in the closed position, contacts a distal edge of the first annular projection to create a circular line contact that restricts or prevents fluid flow through the centrally-disposed circular opening in the flexible annular seal. A rigid annular backplate is adjacent to and in direct physical contact with an annular surface of the flexible seal on a side of the flexible seal opposite the rigid flapper.

In another aspect, a scupper valve includes a rigid flapper coupled to a frame. The rigid flapper is configured to swing relative to the rigid frame between an open and closed position. A flexible annular seal defines a centrally-disposed circular opening and a first annular projection that surrounds the centrally-disposed opening. The rigid flapper, in the closed position, contacts a distal edge of the first annular projection to create a circular line contact that restricts or prevents fluid flow through the centrally-disposed circular opening in the flexible annular seal.

In still another aspect, a vessel includes a hull, a scupper extending through the hull, and a scupper valve at the scupper. The scupper valve has a frame and a rigid flapper coupled to the frame. The rigid flapper is configured to swing relative to the rigid frame between an open and closed position. A flexible annular seal defines a centrally-disposed circular opening and a first annular projection surrounds the centrally-disposed opening. The rigid flapper, in the closed position, contacts a distal edge of the first annular projection to create a circular line contact that restricts or prevents fluid flow through the centrally-disposed circular opening in the flexible annular seal. A rigid annular backplate is adjacent to and in direct physical contact with an entirety of a flat, annular surface of the flexible seal on a side of the flexible seal opposite the rigid flapper. One or more fasteners fasten the scupper valve to the hull at the scupper.

In yet another aspect, a method includes providing an annular frame configured to define a centrally-disposed opening, a substantially annular groove, and a pair of linear grooves that are aligned with one another. The method includes providing a rigid flapper configured to define a flapping portion with an outer edge that follows a substantially circular path for a portion of the circular path's circumference and a support portion that extends upward from a top of the substantially circular flapping portion and outward in two opposite directions to define two support arms. The method includes coupling the support arms of the rigid flapper in the linear grooves of the annular frame. The method includes providing a flexible annular seal that defines a centrally-disposed circular opening, a first annular projection that surrounds the centrally-disposed opening of the flexible annular seal, and a second annular projection that surrounds the centrally-disposed opening of the flexible annular seal. The second annular projection has a diameter that is larger than a diameter of the first annular projection. The method includes positioning the flexible annular seal such that the rigid flapper contacts an entirety of a distal edge of the first annular projection in a closed position and such that second annular projection of the flexible annular seal is inside the substantially annular groove in the annular frame. The method includes providing a flat, rigid annular backplate and positioning the flat, rigid annular backplate adjacent to and in direct physical contact with an entirety of a flat, annular surface of the flexible seal on a side of the flexible seal opposite the rigid flapper, The method includes providing one or more fasteners to fasten the scupper valve to a hull of a vessel.

In some implementations, one or more of the following advantages are present.

For example, in a typical implementation, the scupper valve disclosed herein utilizes a rigid (e.g., stainless steel) flapper and a stationary (e.g., silicone) seal instead of a traditional rubber flapper. This has some major advantages including, for example, improved performance, sleek design, faster drainage, increased lifetime, etc.

Other features and advantages will be apparent from the description and drawings, and from the claims.

BRIEF DESCRIPTION OF THE DRAWINGS

Like reference characters refer to like elements.

DETAILED DESCRIPTION

Figure 1A:
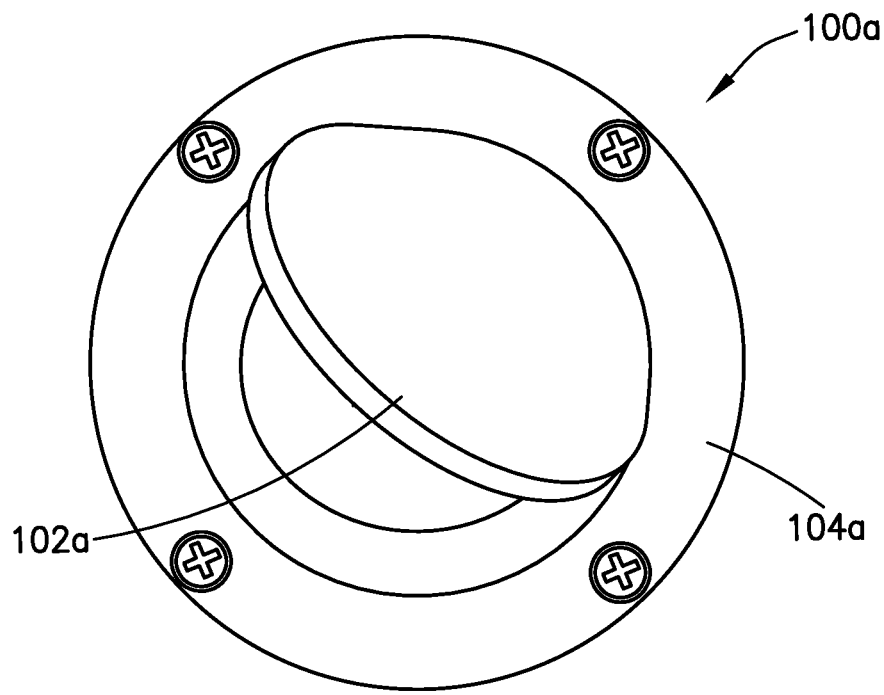
FIGS. 1A to 1C are views of prior art scupper valves.
Figure 1B:
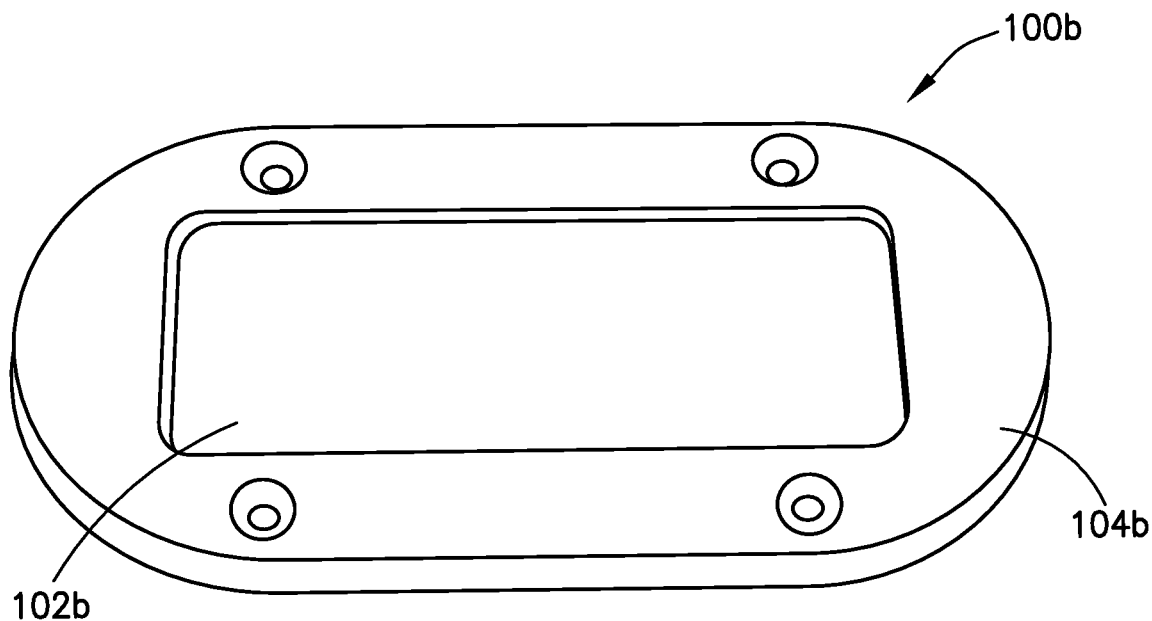
Figure 1C:
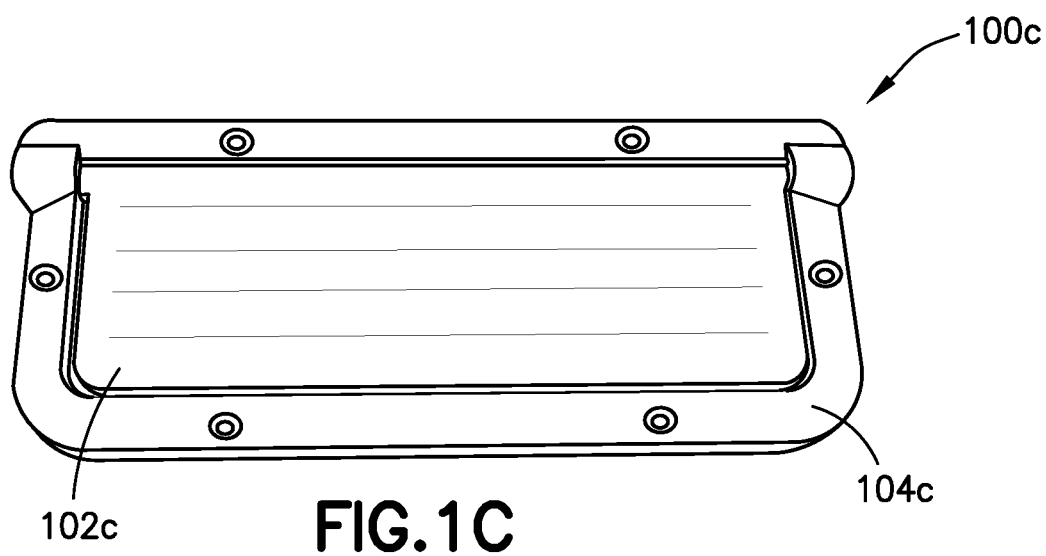

Traditional scupper valves for boats have flexible or rigid flappers coupled to rigid frames. FIG. 1A, for example, shows a prior art scupper valve 100a with a flexible flapper 102a coupled to a rigid frame 104a. FIG. 1B shows an alternative prior art scupper valve 100b with a flexible flapper 102b coupled to a rigid frame 104b. FIG. 1C shows an example of a prior art scupper valve 100c with a rigid flapper 102c coupled to a rigid frame 104c.

The flappers 102a, 102b, 102c in the prior art scupper valves 100a, 100b, 100c act essentially as one-way check valves by flexing (in FIGS. 1A and 1B) or hinging (in FIG. 1C) to open when water is flowing in one direction (e.g., out of the boat) and closing, at least substantially, against their rigid frames 104a, 104b, 104c when water is attempting to flow in the opposite direction (e.g., into the boat).

Each of these prior art scupper valves 100a, 100b, 100c has drawbacks.

For example, the flexible flappers 102a, 102b should be rigid enough to block water and avoid collapsing when water is trying to flow into the boat through the scupper, but flexible enough to create a robust seal at the same time. Additionally, the flexible flappers 102a, 102b should be flexible enough to allow water and debris to flow through the scupper when water and debris are attempting to exit the boat through the scupper. These competing demands make it difficult to optimize the material characteristics of flexible flappers 102a, 102b to perform well under all, or even most, circumstances. As such, scupper valves with flexible flapper (e.g., 102a, 102b), in many instances, perform less than ideally. In some instances, they may leak sometimes allowing water to enter a boat's hull and they may prevent water or other objects from exiting the boat hull efficiently or completely and sometimes get clogged. Variations, such as "duckbill" or "Orea" scupper valves, share similar flaws.

The prior art scupper valve 100c with the rigid flapper 102c has flaws too. Typically, these sorts of scupper valves 100c are found on larger vessels. However, they generally do not have sealing components. Thus, while they may be efficient at allowing drainage, due to the lack of sealing components, they tend to allow water, sometimes significant amounts of water, to backflow into the hull of the vessel.

FIGS. 2-9B are various views showing an implementation of a scupper valve 200 that addresses and/or overcomes several of the shortcomings associated with prior art scupper valves. In a typical implementation, the scupper valve 200 provides a great balance of rigidity and flexibility to allow drainage of water out of a vessel via the scupper while restricting the flow of water into the vessel via the scupper.

Figure 2:
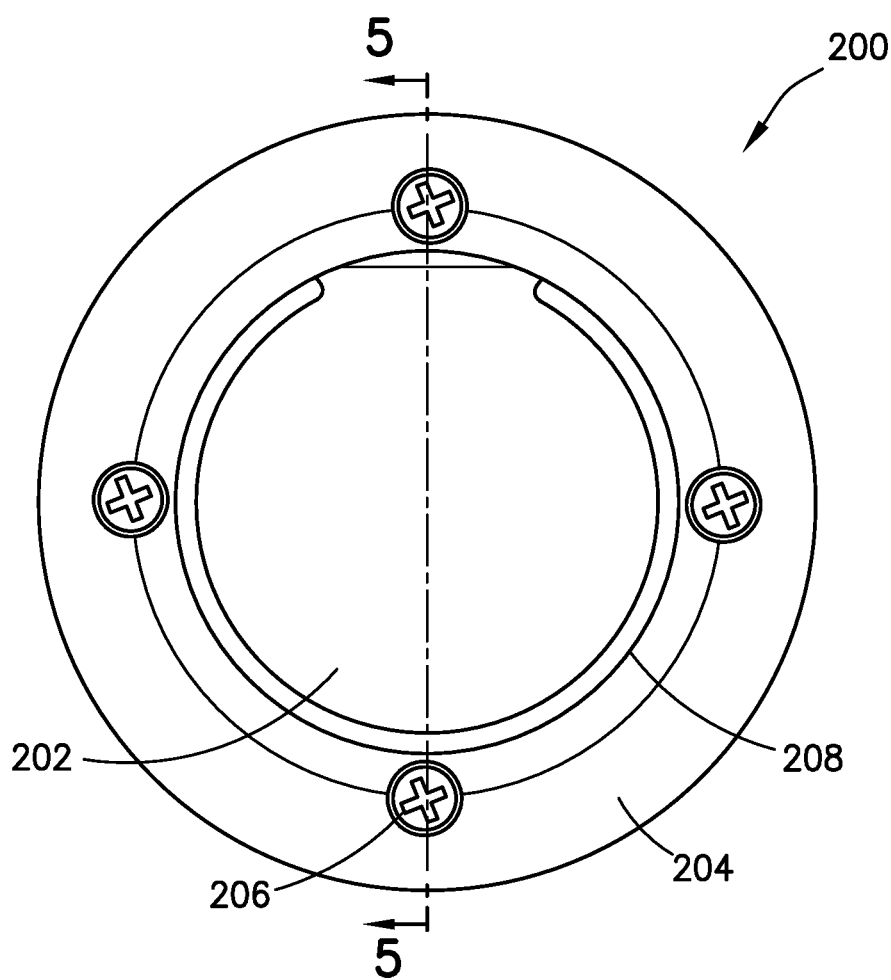
FIG. 2 is a front view of a scupper valve in an assembled state (e.g., as it might appear mounted to an exterior surface of a vessel.

FIG. 2 is a front view of the scupper valve 200 in an assembled state (e.g., as it might appear mounted to an exterior surface of a vessel. The visible portions of the scupper valve 200 include a flapper 202, a frame 204, a seal 208, and fasteners 206.

Figure 3:
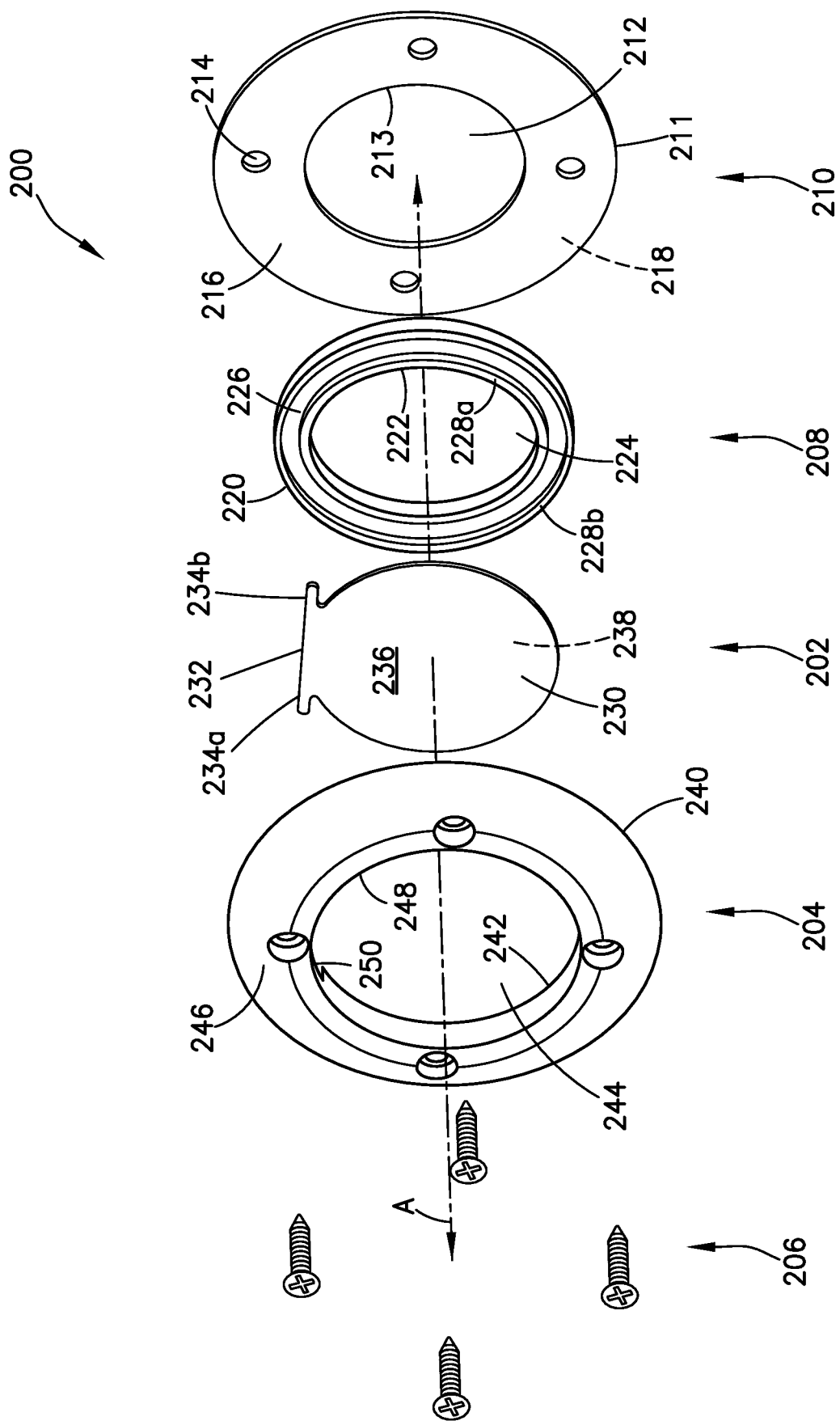
FIG. 3 is an exploded view of the scupper valve from FIG. 2 showing the various components thereof including a backplate, a seal, a flapper, a frame, and fasteners.

FIG. 3 is an exploded view of the scupper valve 200 showing the various components thereof including a backplate 210, a seal 208, the flapper 202, the frame 204, and the fasteners 206. The components shown in the illustrated implementation are arranged along an axis ("A").

The backplate 210, in the illustrated implementation, is a flat, rigid, metallic, disk-shaped element that has a cylindrical/circular outer edge 211 and a substantially concentric, cylindrical/circular inner edge 213 that defines a centrally-disposed inner circular opening 212 that extends through the disk-shaped element in the axial direction ("A"). Four smaller, circular openings 214 extend through the disk-shaped element in the axial direction ("A) as well. These smaller, circular openings 214 are equally-spaced at approximately 90-degree intervals and are sized and shaped to receive the fasteners 206. Each of these openings 214 is positioned in a radial sense approximately halfway between the circular outer edge 211 of the disk-shaped element and the circular inner edge 213 of the disk-shaped element.

The backplate 210 has two major surfaces: a first major surface 216 (that is visible in its entirety in FIG. 3) and a second major surface 218 (that is opposite and parallel to the first major surface and not visible at all in FIG. 3). Each of these major surfaces 216, 218 is completely flat across its entirety.

The backplate 210 can be made from any one of a variety of different rigid materials. Some examples include stainless steel (e.g., grade 316 stainless steel), or any one of a variety of other types of rigid materials, suitable for use in a marine environment, and preferably having some degree of corrosion resistance.

The seal 208, in the illustrated implementation, is a flexible, annular element that has a cylindrical outer edge 220 and a cylindrical inner edge 222 that defines a centrally-disposed inner circular opening 224 that extends through the annular element in the axial direction ("A").

The side of the seal 208 that is substantially visible in FIG. 3 has a flat annular middle portion 226 between two raised annular portions (or ridges)—an inner raised annular portion (or projection) 228a and an outer raised annular portion 228b. The flat annular portion 226 between the two raised annular portions 228a, 228b lies in a plane that is substantially perpendicular to the axis ("A"). The raised annular portions 228a, 228b, in the illustrated implementation, extend from the edges of the flat annular portion 226 substantially parallel to one another and substantially parallel to the axis ("A"). The inner edge of the inner raised annular portion 228a forms part of the cylindrical inner edge 222 of the seal 208, whereas the outer edge of the outer raised annular portion 228b forms part of the cylindrical outer edge 220 of the seal 208.

The backside of the seal 208, which is opposite the side of the seal 208 that is substantially visible in FIG. 3, is not visible at all in FIG. 3. The backside of the seal 208, in a typical implementation, is flat across its entirety and lies in a plane that is substantially perpendicular to the axis ("A").

In a typical implementation, the diameter of the seal's inner circular opening 224 is the same as, or substantially similar to, the diameter of the inner circular opening 212 in the backplate 210. Moreover, in a typical implementation, the diameter of the seal's cylindrical outer edge 220 is small enough so that, when the seal 208 is pressed against the backplate 210, the seal 208 does not cover the small, circular openings 214 in the backplate 210.

The seal 208 can be made from any one of a variety of different flexible materials. Some examples include elastomers (e.g., silicone rubber) or any one of a variety of other types of durable, flexible materials, rubbers, etc. suitable for use in a marine environment.

The flapper 202, in the illustrated implementation, is a flat, rigid, metallic, element that defines a flapping portion 230 and a support portion 232.

The flapping portion 230 of the flapper 202 has an outer edge that follows a substantially circular path for about 85% of the circular path's circumference. The support portion 232 of the flapper 202 extends in an upward and outward manner from the top of the substantially circular flapping portion 230 of the flapper 202. The support portion 232, as shown, extends in the outward manner in two, opposite directions, to define two support arms 234a, 234b and a groove beneath each support arm. The distance across the top of the support portion 232, in the illustrated implementation, is approximately 67% of the diameter of the substantially circular flapping portion 230.

The flapper 202 in the illustrated implementation is sized and shaped so that the flapper 202 can, when appropriately positioned, cover the inner circular opening 224 of the seal 208 in its entirety. Moreover, in a typical implementation, the flapper 202 is sized and shaped so that the flapper 202 can, when appropriately positioned, contact the entirety of the inner raised annular portion 228a of the seal 208.

The flapper 202 in the illustrated implementation has two major surfaces: a first major surface 236 (that is visible in its entirety in FIG. 3) and a second major surface 238 (that is opposite and parallel to the first major surface 236 and not visible at all in FIG. 3). Each of these major surfaces 236, 238 is completely flat across its entirety.

The flapper 202 can be made from any one of a variety of different rigid materials. Some examples include stainless steel (e.g., grade 316 stainless steel), or any one of a variety of other types of rigid materials, suitable for use in a marine environment, and preferably having some degree of corrosion resistance.

The frame 204, in the illustrated implementation, is a rigid, metallic, annular element that has a circular outer edge 240 and a substantially concentric, cylindrical/circular inner edge 242 that defines a centrally-disposed inner circular opening 244 that extends through the annular element in the axial direction ("A"). Four smaller, countersunk, circular openings 246 extend through the annular element in the axial direction ("A) as well. These smaller, circular openings 246 are equally-spaced at approximately 90-degree intervals, are sized, and shaped to receive the fasteners 206, and align with the small openings 214 in the backplate 210. Each of these openings 246 is positioned in a radial sense between the circular outer edge 240 of the annular element and the circular inner edge 242 of the annular element.

The front surface of the frame 204, which is largely visible in FIG. 3, curves gradually from the front edge 248 of the inner circular opening 244 to the outer edge of the frame's back surface (which is the frame's circular outer edge 240).

The inner circular opening 244 is surrounded by a cylindrical walls that are disrupted only by carve outs (partially visible at 250 in FIG. 3) for a supporting structure that can engage the support arms 234a, 234b of the flapper 202 and from which the flapper 202 can hang. The diameter of the inner circular opening 244 is slightly larger than the outer diameter of the substantially circular flapping portion 230 of the flapper 202. This allows the flapper 202 to swing between a closed position (touching the inner raised annular portion 228a of the seal 208) and an open position (with its free, distal end extended through the inner circular opening 244).

The frame 204 can be made from any one of a variety of different rigid materials. Some examples include stainless steel (e.g., grade 316 stainless steel), or any one of a variety of other types of rigid materials, suitable for use in a marine environment, and preferably having some degree of corrosion resistance.

The fasteners 206, in the illustrated implementation, are screws that are sized and shaped to pass through the openings 246 and 214 in the frame 204 and the backplate 210, respectively. The illustrated fasteners 206 are further configured to be screwed into the hull of a ship and thereby hold the scupper valve 200 in place.

FIG. 4A through 4D show the scupper valve 200 and its various components in various stages of assembly.

Figure 4A:
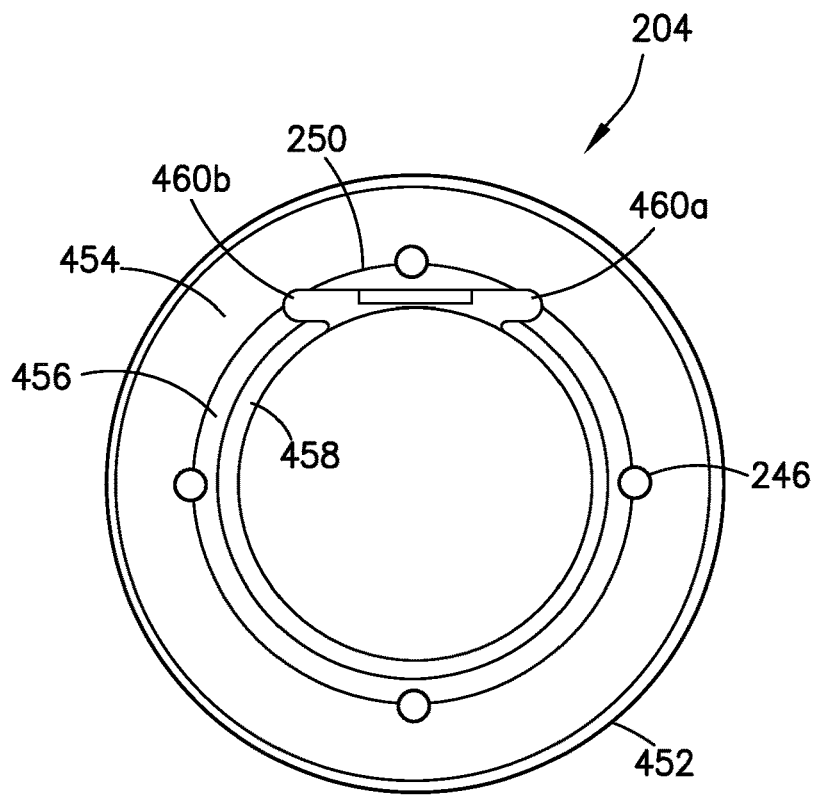
FIG. 4A through 4D show the scupper valve and its various components in various stages of assembly.

FIG. 4A is a rear view of the frame 204. As illustrated, the rear of the frame 204 is surrounded by a raised annular lip 452. Just inside the raised annular lip 452, in a radially inward direction, is a flat, substantially annular surface 454. Just inside the flat, substantially annular surface 454 is a substantially annular groove 456. The substantially annular groove 456 lies between an inner edge of the flat, substantially annular surface 454 and a raised lip 458 that extends around a substantial portion of the inner edge of the frame 204. The four circular openings 246 for the fasteners are shown passing through the frame 204 where the flat annular surface 454 meets the annular groove 456.

The annular nature of surface 454, groove 456, and raised lip 458 are interrupted by a carve out (at 250) near the top of the frame 204 as it is viewed in the FIG. 4A. The carve out (at 250) defines a pair of linear grooves 460a, 460b that are aligned with one another and that each extend from an inner edge of the flat annular portion 454, through the annular groove 456, and through the raised lip 458. These linear grooves 460a, 460b, as shown in FIG. 4B, are contoured to receive the support arms 234a, 234b of the flapper 202.

Figure 4B:
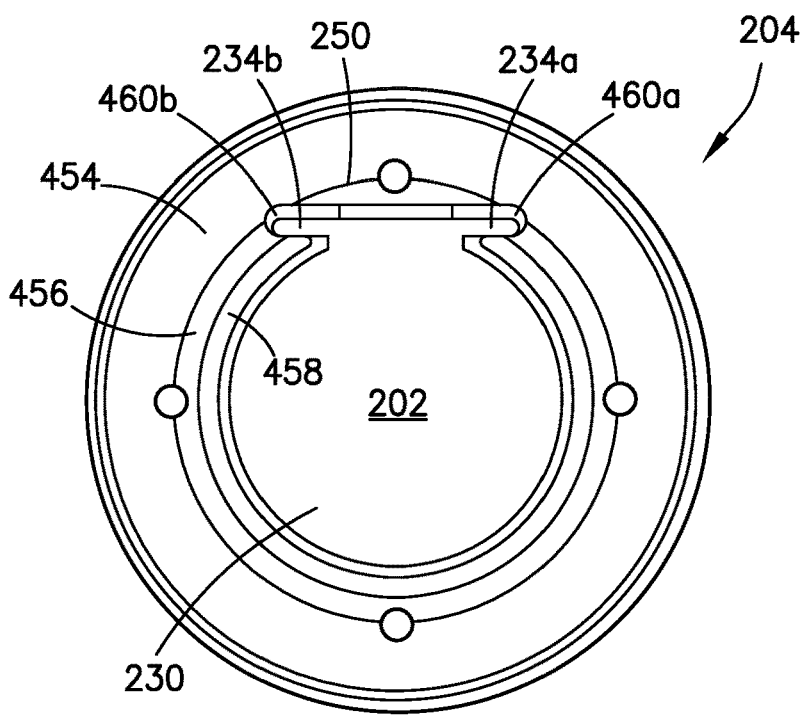

FIG. 4B is a rear view showing the frame 204 with the flapper 202 engaged in the carve out 250 of the frame 204. More specifically, as shown, the support portion 232 of the flapper 202 extends across the top of the frame 204 with the support arms 234a, 234b of the flapper 202 extending into the linear grooves 460a, 460b. With the support arms 234a, 234b so positioned, and when the frame is in a substantially vertically upright position (e.g., mounted to the surface of a hull) the upper distal ends of the inner raised lip 458 support the flapper 202 and the flapper hangs therefrom.

With the flapper 202 so engaged and hanging from the frame 204, the flapping portion 230 of the flapper 202 sits within the inner circular opening 244 of the frame 202 with a small radial gap between the outer edge of the flapping portion 230 of the flapper 202 and the inner annular surface of the frame 202.

Figure 4C:
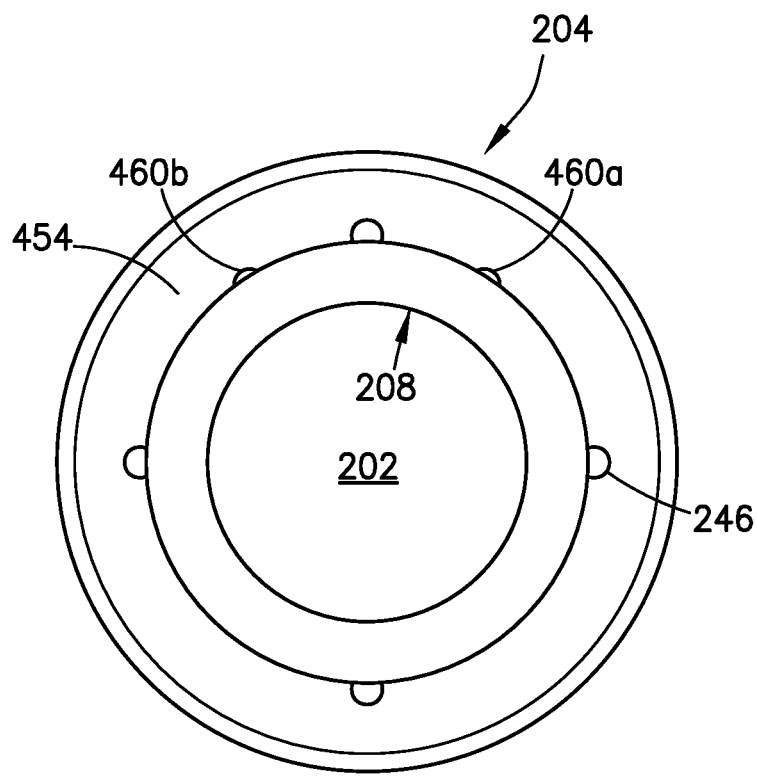

FIG. 4C is a rear view showing the frame 204, with the flapper 202 engaged in the carve out 250 of the frame 204 (as shown in FIG. 4B), and the seal 208 in position relative to the flapper 202 and the frame 250.

The seal 208, as shown, is engaged to the frame 204. More specifically, the outer raised annular portion 228b of the frame (shown in FIG. 3, but not in FIG. 4C) is sitting within the substantially annular groove 456 in the rear of the frame 204 (see FIG. 4A). With the seal 208 so positioned, the flat rear surface of the seal 208, which is fully visible in FIG. 4C, lies in the same plane as the flat annular portion 454 of the frame 204. Moreover, the seal 208, in this position, spans the entire radial gap between the outer edge of the flapping portion 230 of the flapper 202 and the inner annular surface of the frame 202 (which is visible in FIG. 4B).

Figure 4D:
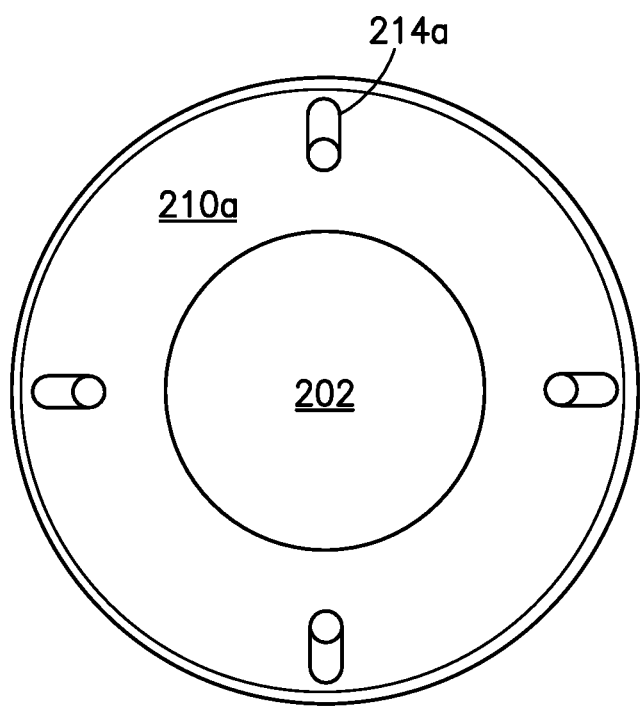

FIG. 4D is a rear view showing the assembly of FIG. 4C (which included the frame 204, the flapper 202, and the seal 208) with a backplate 210a in place covering the seal 208. The backplate 210a in FIG. 4D is slightly different than the backplate 210 in FIG. 3. More specifically, the backplate 210a in FIG. 4D has slotted fastener openings 214a, whereas the backplate 210 in FIG. 3 has circular fastener openings 214.

The backplate 210a has an outer diameter that just smaller than the inner diameter of the frame's outer annular lip 452. Thus, the backplate 210a, in assembly, fits within the outer annular lip 452, which helps to align the backplate 210a relative to the frame 204. As shown, the fastener openings 214a in the backplate 210a are aligned with the fastener openings 246 in the frame 204. Moreover, the frame's outer annular lip 452 and the rear-facing surface of the backplate 210 (which is fully visible in FIG. 4D) collectively form a substantially flat rear surface for a fully assembled scupper valve.

Moreover, the backplate 210a has an inner diameter that is smaller than the inner diameter of both the frame 204 and the seal 208. Therefore, the backplate 210a, in assembly, covers the seal 208 completely, and the entire flat back surface of the seal 208 rests against the backplate 210.

Figure 5:
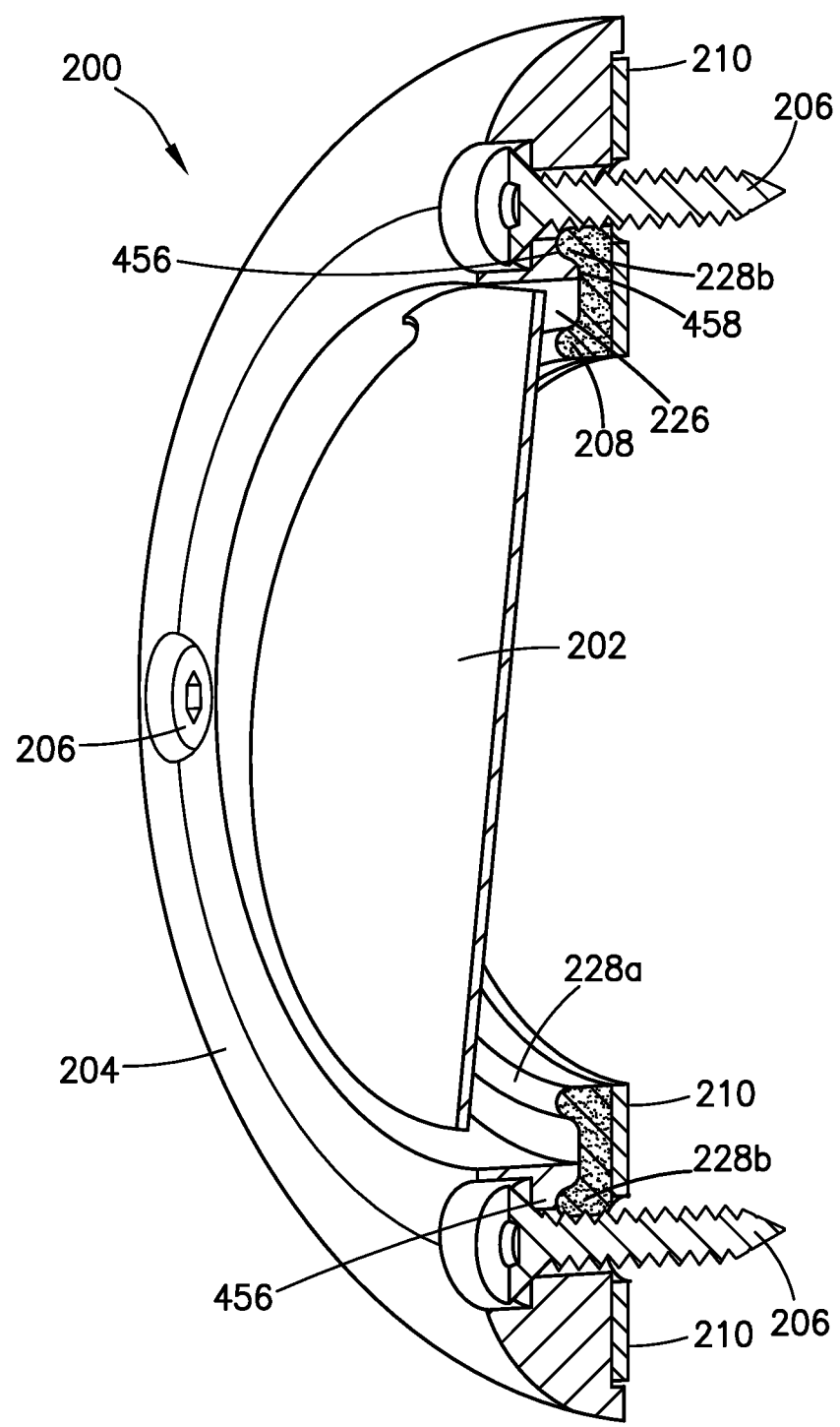
FIG. 5 is a cross-sectional view of the scupper valve, in an assembled state, taken across line 5-5 in FIG. 2.

FIG. 5 is a cross-sectional view of the scupper valve 200, in an assembled state, taken across line 5-5 in FIG. 2. Parts of the flapper 202, frame 204, seal 208, backing plate 210, and fasteners 206 are shown in the illustrated figure.

Of note, it can be seen that the outer raised annular portion 228b of the seal 208 fits snugly within the substantially annular groove 456 in the rear surface of the frame 204. Where the fasteners 206 are located, they pass through the assembly adjacent to an outer cylindrical edge of the seal 208. Meanwhile, the distal end of the raised lip 458 that extends around a substantial portion of the inner edge of the frame 204 contacts or is positioned very close to the flat annular middle portion 226 of the seal 208. Additionally, the inner raised annular portion 228a of the seal 208 is positioned so that the flapper 202 can contact its distal, circular outer edge. Moreover, the flat back surface of the seal 208 is in contact with the backing plate 210.

Figure 6:
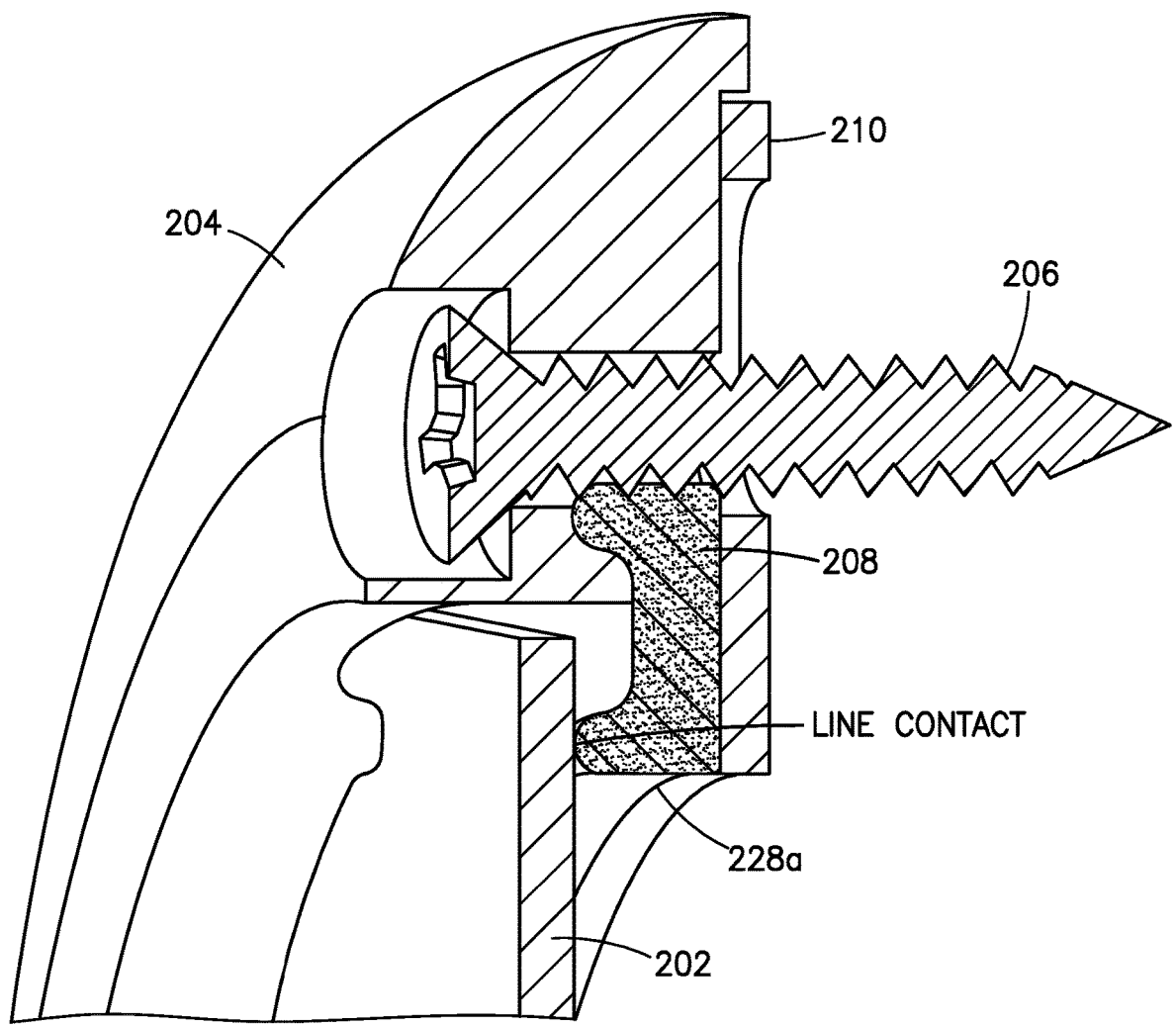
FIG. 6 is a partial, cross-sectional view showing the scupper valve with its flapper in a closed position contacting a distal tip of an inner raised annular portion of the scupper valve's seal.

FIG. 6 is a partial, cross-sectional view showing how a portion of the flapper 202, when closed, contacts a distal tip of the inner raised annular portion 228a of the seal 208. With the flapper 202 in the position shown, the flapper 202 would contact the distal tip of the inner raised annular portion 228a of the seal 208 around the entire perimeter of the inner raised annular portion 228a of the seal 208. In a typical implementation, the illustrated configuration of the seal 208 and flapper 202 allows for the flat rigid flapper to sit on a theoretical line (or approximate line) contact that is in the shape of a circle. This is significant because the force of the water on the flapper 202 tends to be directed directly on this line contact as opposed to being distributed (e.g., on a 2 dimensional larger surface such as a flat surface used in other designs). This creates a high pressure on the seal contact area allowing for great sealing functionality.

Figure 7:
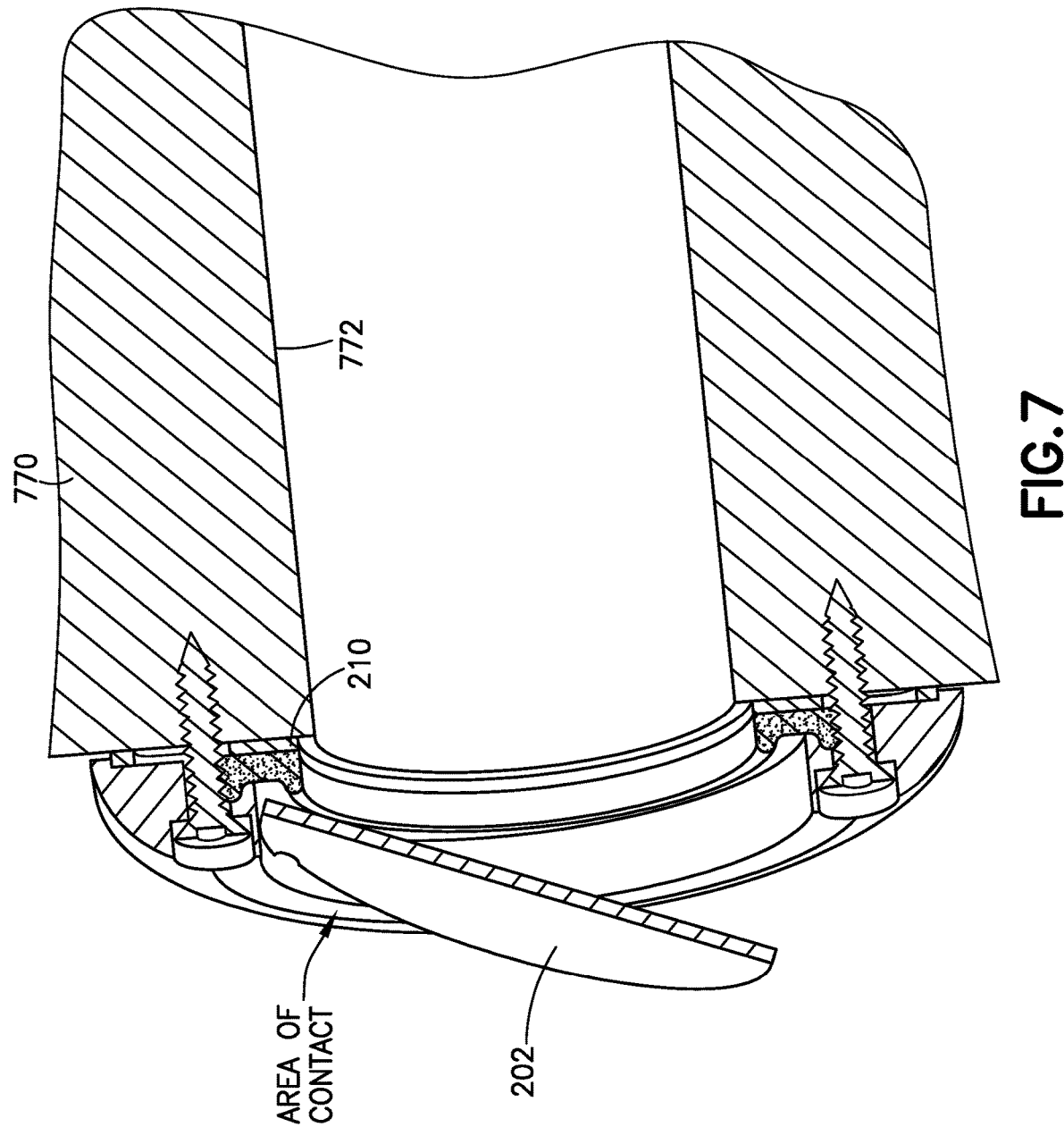
FIG. 7 is a partial cross-sectional view showing the scupper attached to a hull of a vessel and configured to control fluid flow through a scupper in a hull of a vessel.

FIG. 7 is a partial cross-sectional view showing the scupper valve 200 attached to the hull 770 of a vessel and configured to control fluid flow through a scupper 772 in the hull 770.

The flapper 202 in the illustrated figure is shown in the most open position that the flapper 202 can reach. More specifically, the flapper 202 in the illustrated figure is being prevented from swinging open any farther by the front edge 248 of the inner circular opening 244 of the frame 204. Thus, in the illustrated implementation, the scupper frame 204 controls and constrains the range of motion of the flapper 202 in the illustrated surface mounted application.

A surface mounted scupper (e.g., mounted onto the surface of the boat transom, similar to what is shown in FIG. 7) has its flapper 202 exposed to wave action. If not sufficiently constrained, the wave action can force a free-swinging hinged rigid door, for example, wide open allowing significant amounts of water to backflow into the vessel through the scupper before seating properly. This can happen, for example, in the prior art rectangular scupper valve 104c shown in FIG. 1C, for example. The image in FIG. 7 shows an example how the frame 204 controls the maximum angle the hinged flapper 202 is allowed to open. The arrow points to the area of contact between the frame 204 and the flapper 202.

In some implementations, the contact (between flapper 202 and the front edge 248 of the inner circular opening 244 of the frame 204) limits the angle of the flapper (relative to its closed position against the seal) to about 25 degrees. This angle can vary in different implementations, of course. For example, in various implementations, the maximum opening angle for the flapper 202 may be anywhere between 20 degrees and 30 degrees, or between 15 degrees and 35 degrees. In various implementations, the angle can be anywhere between 15 degrees and 45 degrees. These are just a few examples. Other angles, or ranges of angles, are possible as well.

Figure 8:
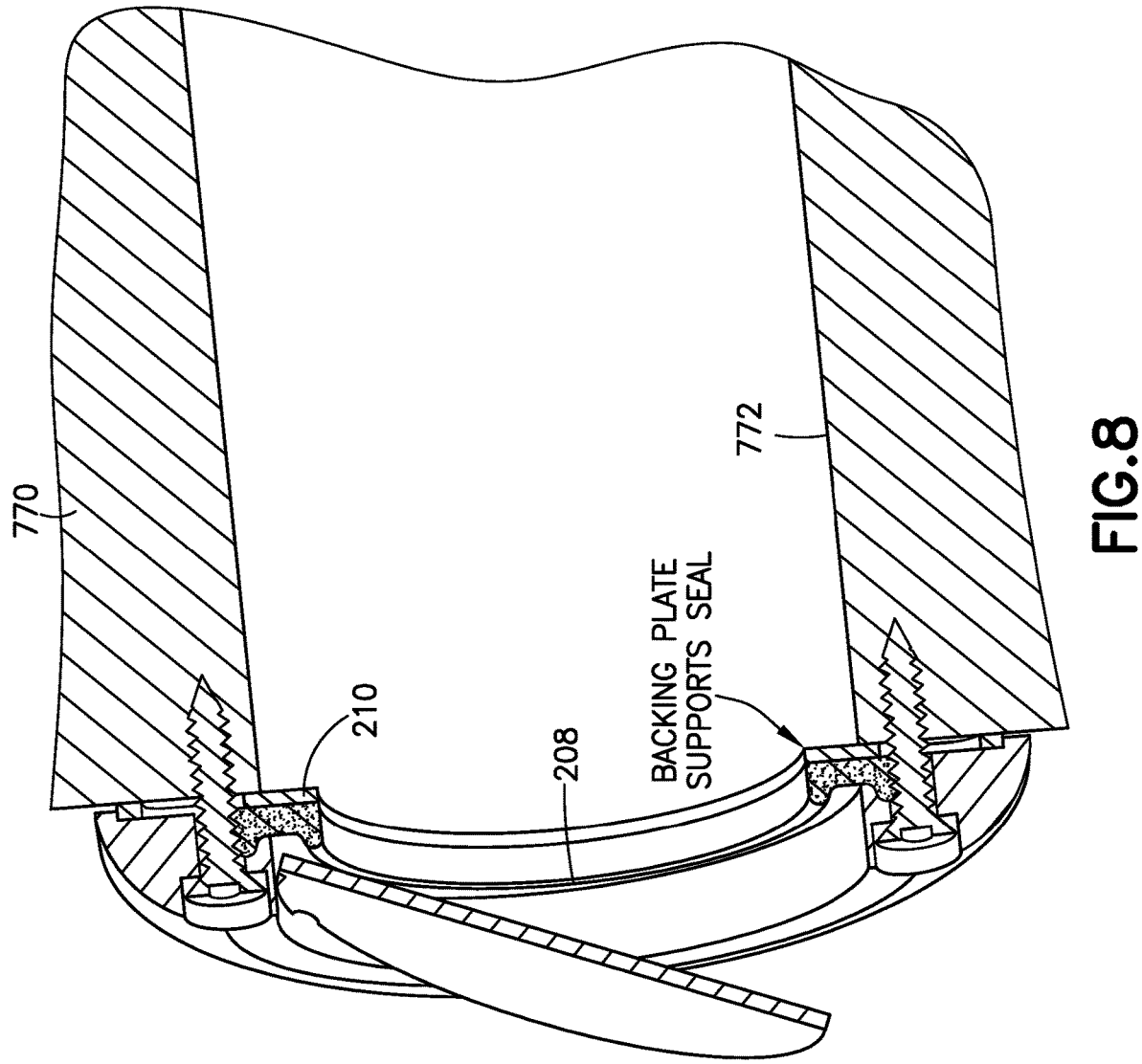
FIG. 8 shows a similar arrangement as in FIG. 7 except in FIG. 8, the scupper has a larger diameter than the inner diameter of the central opening in the backing plate of the scupper valve.

In FIG. 7, the scupper 772 has a smaller diameter than the inner diameter of the central opening in the backing plate 210. FIG. 8 shows a similar arrangement as in FIG. 7 except in FIG. 8, the scupper 882 has a larger diameter than the inner diameter of the central opening in the backing plate 210.

The implementation in FIG. 8 highlights the notion that the rigid backing plate 210 can support and constrain the seal 208, which typically is stationary and elastomeric. The stationary seal 208 in the illustrated implementation may be constructed from a low durometer (very flexible) elastomer. In various implementations, the hardness of the seal material can have a durometer between about 5 and 80 on the Shore 00 scale. In some implementations, the hardness of the seal is a durometer between 25 and 35 on the Shore A durometer. As a point of contrast, many existing rubber door flapper designs require much stiffer durometers as the flexible rubber doors must have some rigidity to withstand the force of the water (e.g., Shore A 50 to 90).

The low durometer material may facilitate creating an adequate seal with the rigid flapper 202. The rigid backing plate 210 helps the seal 208 to maintain its shape. Additionally, to help the seal 208 remain seated in the assembly, the backing plate 210 maintains a constant force on the seal 208 that urges the seal 208 into the frames grooves via the perfectly flat surface of the backing plate 210.

Figure 9:
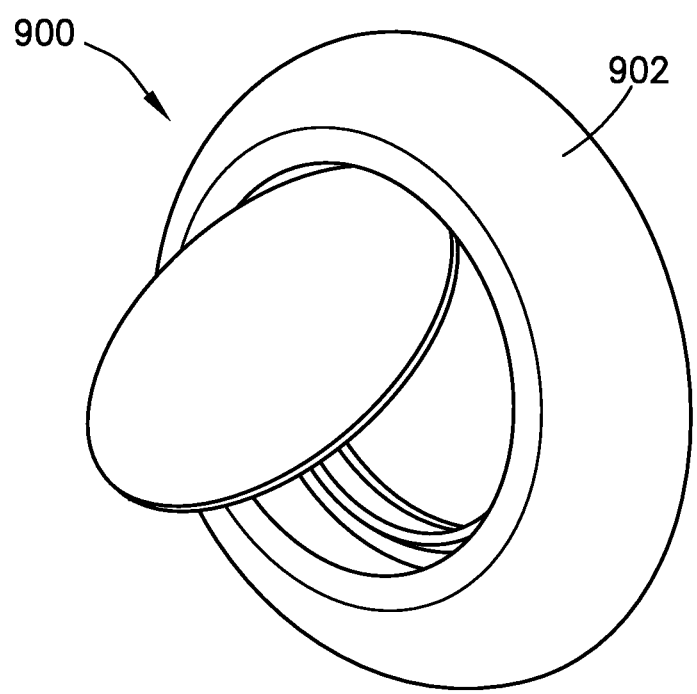
FIG. 9 is a perspective view of an alternative design for a scupper valve.

FIG. 9 is a perspective view of an alternative design for a scupper valve 900.

Unlike the scupper valve 200 discussed above, the illustrated scupper valve 900 does not have screws as fasteners. Instead, in a typical implementation, the scupper valve 900 in FIG. 9 would be mounted (e.g., to the hull of a vessel) with an adhesive attached to the rear surface (not visible in FIG. 9) of the frame 902. A wide variety of adhesives may be suitable for this sort of application. In one example, the adhesive may be a disk-shaped piece of VHB™ high-strength, double-sided, acrylic foam tape, available from the 3M™ company. Moreover, in the illustrated implementation, the other components of the scupper valve (e.g., the frame, the flapper, the seal, and the backing plate) would be held together as well (e.g., by adhesives, being welded together, etc.)

Since the scupper valve 900 does not utilize screw fasteners, the outer surface of the scupper valve's frame 902 is simpler and perhaps, in some ways, more visually appealing than the scupper valve 200 discussed above.

Figures 10A, 10B:
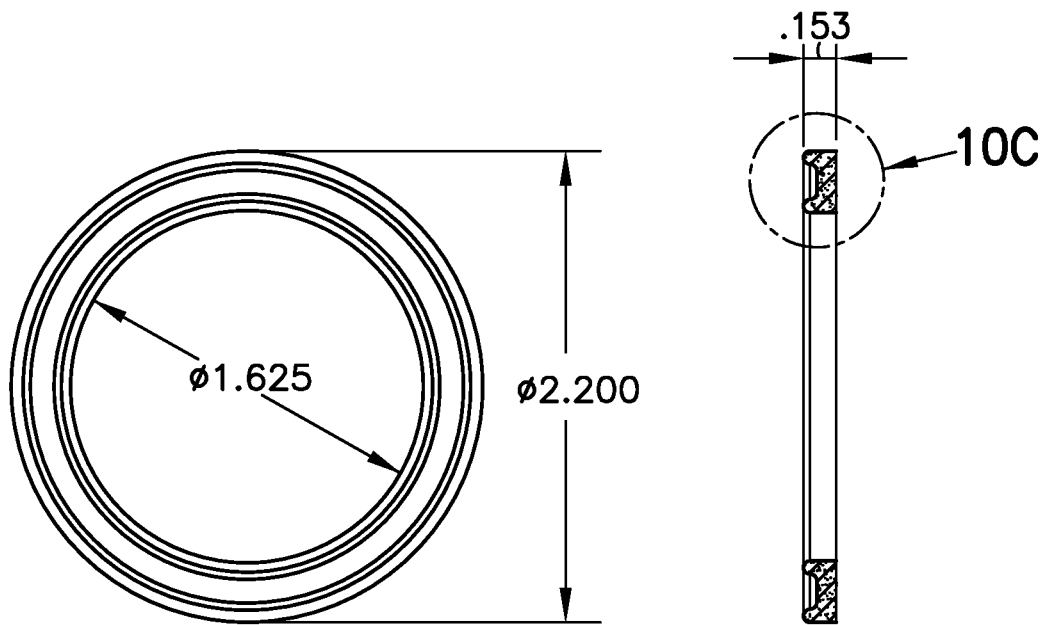
FIG. 10A is a front view of an exemplary seal for a scupper valve.
FIG. 10B is a cross-sectional side view of the exemplary seal from FIG. 10A.
Figure 10C:
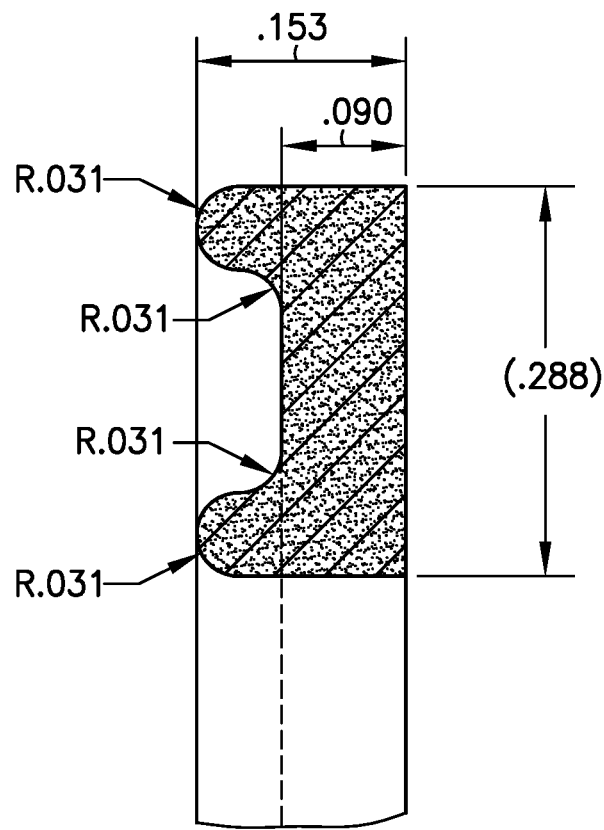
FIG. 10C is a detail view showing a portion of the cross-sectional side view of the exemplary seal from FIG. 10B.
Figure 11A:
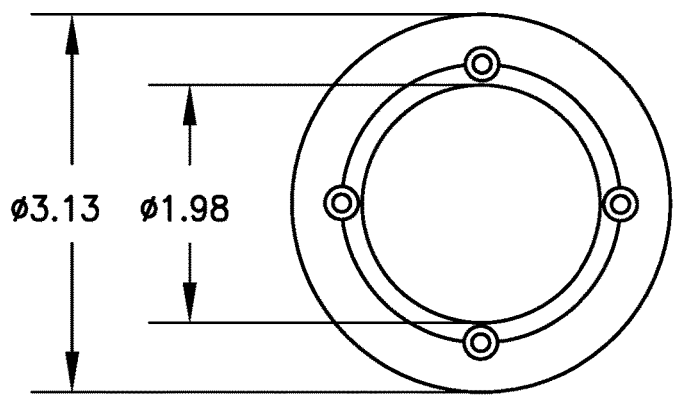
FIG. 11A is a front view of an exemplary frame for a scupper valve.
Figure 11B:
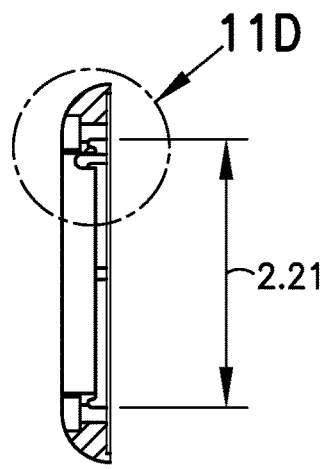
FIG. 11B is a cross-sectional side view of the exemplary frame from FIG. 11A.
Figure 11C:
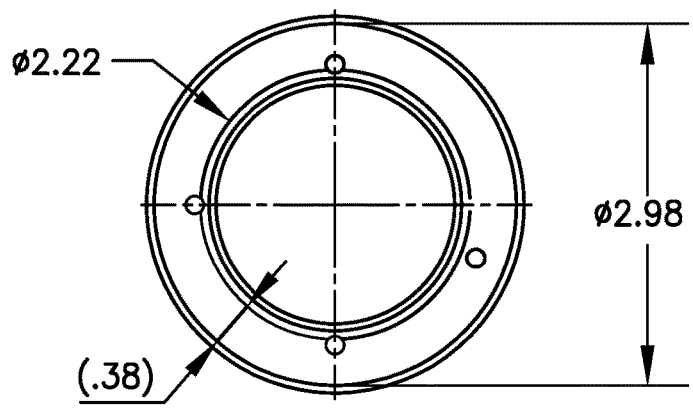
FIG. 11C is a rear view of the exemplary frame from FIG. 11A.
Figure 11D:
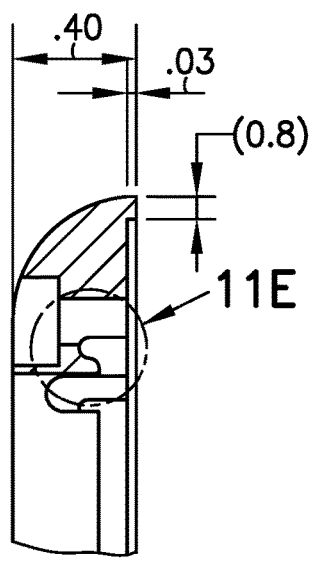
FIG. 11D is a detail view showing a portion of the cross-sectional side view of the exemplary frame from FIG. 11B.
Figure 11E:
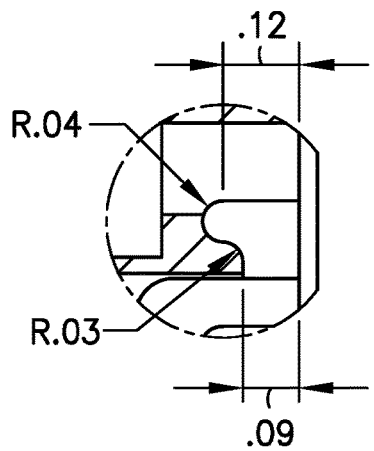
FIG. 11E is a detail view showing a portion of the cross-sectional side view of the exemplary frame from FIG. 11D.

FIGS. 10A to 10C show an exemplary seal (like seal 208) for a scupper valve along with exemplary dimensions (in inches) for that seal.

FIGS. 11A to 11E show an exemplary frame (like 204) for a scupper valve along with exemplary dimensions (in inches) for that frame.

A number of embodiments of the invention have been described. Nevertheless, it will be understood that various modifications may be made without departing from the spirit and scope of the invention.

For example, in various implementations, the specific configuration, as well as dimensions, absolute or relative, of the scupper valve and/or one or more of its components may vary. dimensions, both absolute and relative, may vary (e.g., +/−5% or more) from what is explicitly disclosed herein). In an exemplary implementation, the scupper valve defines a 1.625 inch thru hole, which is larger than common plastic frame scupper, which may have a 1.375 inch thru hole. A scupper valve thus sized may fit, for example, over a standard flared brass drain tube, which usually has a 1.5 inch flare. The 1.625 inch thru hole and free swinging flapper tend to allow for quick deck drainage. These can vary.

In an exemplary implementation, the center points of diametrically opposite fastener holes in a frame are 2.31 inches apart. Moreover, in an exemplary implementation, the outer diameter of the frame of a scupper valve may be 3.12 inches. These can vary too.

The flapper 202 in FIG. 7, for example, is shown in a most open position, being prevented from swinging open any farther by the front edge 248 of the inner circular opening 244 of the frame 204. In various implementations, the flapper 202 may be prevented from swinging open beyond some particular angle by some other part of the frame than the front edge 248 of the inner circular opening. For example, in some implementations, the frame may be fit with a nub or some structure that the flapper 202 contacts before reaching the front edge of the inner circular opening.

The flapper can be coupled to the frame in any one of a variety of manners that enable the flapper to swing between a closed and open position relative to the frame. For example, the flapper could, instead of being coupled to the frame as shown in the figures and otherwise described herein, could be attached to the frame via a hinge connection.

The distal tip of the inner raised annular portion 228a in the illustrated implementation is rounded. Other shapes are possible as well. For example, in one alternative implementation, the distal tip of the inner raised annular portion 228a could form a point that slants away linearly in each direction from the point. In that example, the point would form a circle (against which the flapper could seal) around the seal 208.

The application describes a circular line contact that is formed between the inner raised annular portion 228a of the seal 208 and the rear surface of the flapper 202 when the flapper 202 moves into a closed position. This line contact may have some thickness, which may depend, for example, on the specific geometry and degree of flexibility of the inner raised annular portion 228a of the seal 208. Typically, the thickness of the circular line contact is not more than 0.1 inch, more preferably not more than 0.05 inches, and in some implementations significantly smaller than that. Moreover, in most implementations, the thickness of line contact is substantially uniform around the entire circumference of the circular line contact when the flapper 202 is in a fully closed position, which may correspond to the flapper 202 being disposed in a plane that is perpendicular to axis ("A") in FIG. 3, for example.

Various implementations may utilize different types of fasteners and/or arrangement thereof.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Other implementations are within the scope of the claims.

What is claimed is:

1. A scupper valve comprising:
   a frame;
   a rigid flapper coupled to the frame, wherein the rigid flapper is configured to swing relative to the rigid frame between an open and closed position;
   a flexible annular seal that defines a centrally-disposed circular opening and a first annular projection that surrounds the centrally-disposed opening,
   wherein the rigid flapper, in the closed position, contacts a distal edge of the first annular projection to create a circular line contact that restricts or prevents fluid flow through the centrally-disposed circular opening in the flexible annular seal; and
   a rigid annular backplate adjacent to and in direct physical contact with an annular surface of the flexible seal on a side of the flexible seal opposite the rigid flapper; and
   wherein the frame defines a centrally-disposed circular opening through which the rigid flapper swings when moving between the open and closed positions, wherein the centrally-disposed circular opening in the frame has a front edge that the rigid flapper physically contacts when the rigid flapper reaches the particular angular orientation.

2. The scupper valve of claim 1, wherein the rigid flapper is configured to press against and compress the distal edge of the first annular projection of the flexible annular seal in the closed position.

3. The scupper valve of claim 1, wherein the frame is configured to prevent the rigid flapper from swinging beyond a particular angular orientation in the open position.

4. The scupper valve of claim 1, wherein the particular angular orientation is between 15 degrees and 35 degrees from the closed position.

5. The scupper valve of claim 1, wherein the flexible annular seal further defines a second annular projection that surrounds the centrally-disposed opening, wherein the second annular projection is on a same side of the flexible annular seal as the first annular projection, and wherein the second annular projection has a larger diameter than the first annular projection,
wherein the frame is contoured to define a substantially annular groove,
wherein the second annular projection on the flexible annular seal is located within the substantially annular groove of the frame.

6. The scupper valve of claim 1, wherein rigid flapper comprises:
a flapping portion with an outer edge that follows a substantially circular path for a portion of the circular path's circumference; and
a support portion that extends in an upward from the top of the substantially circular flapping portion and outward in two opposite directions to define two support arms, and
wherein the frame is contoured to define a pair of linear grooves that are aligned with one another and that are configured to receive the support arms of the rigid flapper.

7. The scupper valve of claim 1, wherein the rigid annular backplate is in direct physical contact with an entirety of the annular surface of the flexible seal on the side of the flexible seal opposite the rigid flapper.

8. The scupper valve of claim 1, further comprising:
one or more fasteners configured to fasten the scupper valve to a surface of a vessel at a scupper.

9. The scupper valve of claim 8, wherein the rigid flapper is configured such that a distal end of the rigid flapper faces away from the vessel when the scupper valve is coupled to an outer surface of the vessel at the scupper and the rigid flapper is in the open position.

10. The scupper valve of claim 1, wherein the seal has a durometer between 5 and 80 on a Shore 00 scale.

11. A vessel comprising:
a hull;
a scupper extending through the hull; and
a scupper valve at the scupper, wherein the scupper valve comprises:
a frame;
a rigid flapper coupled to the frame, wherein the rigid flapper is configured to swing relative to the rigid frame between an open and closed position;
a flexible annular seal that defines a centrally-disposed circular opening and a first annular projection that surrounds the centrally-disposed opening,
wherein the rigid flapper, in the closed position, contacts a distal edge of the first annular projection to create a circular line contact that restricts or prevents fluid flow through the centrally-disposed circular opening in the flexible annular seal;
a rigid annular backplate adjacent to and in direct physical contact with an entirety of a flat, annular surface of the flexible seal on a side of the flexible seal opposite the rigid flapper; and
one or more fasteners fastening the scupper valve to the hull at the scupper.

12. The vessel of claim 11, wherein the rigid flapper is configured to press against and compress the distal edge of the first annular projection of the flexible annular seal in the closed position.

13. The vessel of claim 11, wherein the frame is configured to prevent the rigid flapper from swinging beyond a particular angular orientation in the open position,
wherein the frame defines a centrally-disposed circular opening through which the rigid flapper swings when moving between the open and closed positions,
wherein the centrally-disposed circular opening in the frame has a front edge that the rigid flapper physically contacts when the rigid flapper reaches the particular angular orientation, and
wherein the particular angular orientation is between 15 degrees and 35 degrees from the closed position.

14. The vessel of claim 11, wherein the rigid flapper faces away from the vessel, when the rigid flapper is in the open position.

15. The vessel of claim 11, wherein the rigid flapper is configured to press against and compress the distal edge of the first annular projection of the flexible annular seal in the closed position.

16. The vessel of claim 11, wherein the seal has a durometer between 5 and 80 on a Shore 00 scale.

17. A method comprising:
providing an annular frame configured to define a centrally-disposed opening, a substantially annular groove, and a pair of linear grooves that are aligned with one another;
providing a rigid flapper configured to define a flapping portion with an outer edge that follows a substantially circular path for a portion of the circular path's circumference and a support portion that extends upward from a top of the substantially circular flapping portion and outward in two opposite directions to define two support arms;
coupling the support arms of the rigid flapper in the linear grooves of the annular frame;
providing a flexible annular seal that defines a centrally-disposed circular opening, a first annular projection that surrounds the centrally-disposed opening of the flexible annular seal, and a second annular projection that surrounds the centrally-disposed opening of the flexible annular seal, wherein the second annular projection has a diameter that is larger than a diameter of the first annular projection;
positioning the flexible annular seal such that the rigid flapper contacts an entirety of a distal edge of the first annular projection in a closed position and such that second annular projection of the flexible annular seal is inside the substantially annular groove in the annular frame;
providing a flat, rigid annular backplate;
positioning the flat, rigid annular backplate adjacent to and in direct physical contact with an entirety of a flat, annular surface of the flexible seal on a side of the flexible seal opposite the rigid flapper; and providing one or more fasteners to fasten the scupper valve to a hull of a vessel.

18. The method of claim 17, wherein the one or more fasteners are screws, the method further comprising:
passing the screws through openings in the frame and the backing plate and into a hull of a vessel to hold the annular frame, the rigid flapper, the flexible annular seal, and the backing plate together and against the hull.

19. A scupper valve comprising:
a frame;
a rigid flapper coupled to the frame, wherein the rigid flapper is configured to swing relative to the rigid frame between an open and closed position; and
a flexible annular seal that defines a centrally-disposed circular opening and a first annular projection that surrounds the centrally-disposed opening,
wherein the rigid flapper, in the closed position, contacts a distal edge of the first annular projection to create a circular line contact that restricts or prevents fluid flow through the centrally-disposed circular opening in the flexible annular seal; and
a rigid annular backplate adjacent to and in direct physical contact with an annular surface of the flexible seal on a side of the flexible seal opposite the rigid flapper, and
wherein the rigid annular backplate is in direct physical contact with an entirety of the annular surface of the flexible seal on the side of the flexible seal opposite the rigid flapper.

20. The scupper valve of claim 19, wherein the rigid flapper is configured to press against and compress the distal edge of the first annular projection of the flexible annular seal in the closed position.

21. The scupper valve of claim 19, wherein the frame is configured to prevent the rigid flapper from swinging beyond a particular angular orientation in the open position.

22. The scupper valve of claim 21, wherein the frame defines a centrally-disposed circular opening through which the rigid flapper swings when moving between the open and closed positions, wherein the centrally-disposed circular opening in the frame has a front edge that the rigid flapper physically contacts when the rigid flapper reaches the particular angular orientation.

23. The scupper valve of claim 21, wherein the particular angular orientation is between 15 degrees and 35 degrees from the closed position.

24. The scupper valve of claim 19, wherein the flexible annular seal further defines a second annular projection that surrounds the centrally-disposed opening, wherein the second annular projection is on a same side of the flexible annular seal as the first annular projection, and wherein the second annular projection has a larger diameter than the first annular projection,
wherein the frame is contoured to define a substantially annular groove,
wherein the second annular projection on the flexible annular seal is located within the substantially annular groove of the frame.

25. The scupper valve of claim 19, wherein rigid flapper comprises:
a flapping portion with an outer edge that follows a substantially circular path for a portion of the circular path's circumference; and
a support portion that extends in an upward from the top of the substantially circular flapping portion and outward in two opposite directions to define two support arms, and
wherein the frame is contoured to define a pair of linear grooves that are aligned with one another and that are configured to receive the support arms of the rigid flapper.

26. The scupper valve of claim 19, wherein the rigid annular backplate is in direct physical contact with an entirety of the annular surface of the flexible seal on the side of the flexible seal opposite the rigid flapper.

27. The scupper valve of claim 19, further comprising:
one or more fasteners configured to fasten the scupper valve to a surface of a vessel at a scupper.

28. The scupper valve of claim 27, wherein the rigid flapper is configured such that a distal end of the rigid flapper faces away from the vessel when the scupper valve is coupled to an outer surface of the vessel at the scupper and the rigid flapper is in the open position.

29. The scupper valve of claim 19, wherein the seal has a durometer between 5 and 80 on a Shore 00 scale.

* * * * *